United States Patent
Fäller

(10) Patent No.: US 7,637,290 B2
(45) Date of Patent: Dec. 29, 2009

(54) CONTROL DEVICE FOR A SHIFT CLUTCH OF A DOBBY

(75) Inventor: Armin Fäller, Albstadt (DE)

(73) Assignee: Groz-Beckert KG, Albstadt (DE)

( * ) Notice: Subject to any disclaimer, the term of this patent is extended or adjusted under 35 U.S.C. 154(b) by 16 days.

(21) Appl. No.: 12/146,174

(22) Filed: Jun. 25, 2008

(65) Prior Publication Data

US 2009/0014085 A1 Jan. 15, 2009

(51) Int. Cl.
*D03C 1/14* (2006.01)
*D03C 13/00* (2006.01)
*D03C 1/00* (2006.01)

(52) U.S. Cl. ............... 139/76; 139/55.1; 139/56; 139/57; 139/58; 139/66 A

(58) Field of Classification Search ........... 139/55.1, 139/56–58, 66 R, 76, 66 A
See application file for complete search history.

(56) References Cited

U.S. PATENT DOCUMENTS

| | | | | |
|---|---|---|---|---|
| 2,377,800 A | * | 6/1945 | Mascarenhas | 139/11 |
| 3,818,951 A | * | 6/1974 | Greenwood | 139/20 |
| 4,458,725 A | * | 7/1984 | Schwarz | 139/1 E |
| 4,461,325 A | * | 7/1984 | Palau et al. | 139/68 |
| 4,566,566 A | * | 1/1986 | Vuillet | 192/24 |
| 4,875,565 A | * | 10/1989 | Depoli | 192/48.2 |
| 5,029,618 A | * | 7/1991 | Kleiner | 139/455 |
| 5,174,342 A | * | 12/1992 | Vinciguerra | 139/76 |
| 5,908,051 A | * | 6/1999 | Froment et al. | 139/66 R |
| 2007/0137719 A1 | * | 6/2007 | Pohl | 139/55.1 |

* cited by examiner

*Primary Examiner*—Bobby H Muromoto, Jr.
(74) *Attorney, Agent, or Firm*—Fitch, Even, Tabin & Flannery; Norman N. Kunitz

(57) ABSTRACT

A control device (53) for a clutch assembly (11) of a dobby comprises a selecting finger (28) that is driven by an electromagnet (37). The selecting finger is rigidly connected to an armature (47) that has a curved armature section and a straight armature section. Together with an appropriately curved pole (45) of the magnetic circuit, the curved armature section forms an air gap (48) that is preferably not influenced by the pivot position of the selecting finger. The other pole (46) of the electromagnet (37) forms a preferably straight air gap (49), said air gap being variable and having a size that is a function of the pivot position of the selecting finger. Due to the existing lever ratios, the maximum width of the trapezoidal gap is substantially smaller than the path of the outer end of the selecting finger (28) between its two selection positions. The distance (A) between the pivot center (32) and the variable air gap (49) is substantially smaller than the length of the selecting finger (28).

10 Claims, 8 Drawing Sheets

CONTROL DEVICE FOR A SHIFT CLUTCH OF A DOBBY

CROSS REFERENCE TO RELATED APPLICATION

The present application claims the priority of European Patent Application No. 07 013 688.2, filed Jul. 12, 2007, the subject matter of which, in its entirety, is incorporated herein by reference.

BACKGROUND OF THE INVENTION

The invention relates to a control device for the control of a shift clutch of a dobby such as is used for driving heald shafts of weaving machines.

Such dobbies comprise shift clutches with a control device that has been shown by document DE 697 01 619 T2, for example. The control device comprises a carrier that is driven so as to oscillate. A pivotally supported shift finger is provided on the carrier. In a first pivot position, this finger actuates one rocker arm, while a second rocker arm remains inactive. In its second pivot position, the selecting finger actuates a second rocker arm, while the first rocker arm remains inactive. The rocker arms are used to control a shift clutch in order to define whether or not an eccentric driving a specific heald shaft is to carry out (half) a rotation.

An electromagnet is provided for moving the shift finger that comprises an armature that is hinged to the selecting finger. The free end of the armature abuts against the electromagnet and delimits, therewith, a triangular air gap. The actuation of the selecting finger occurs against the force of a compression spring, said compression spring pushing the selecting finger away from the electromagnet into one of the two shift positions. If the electromagnet attracts the armature against the force of this compression spring, the selecting lever pivots into its other possible pivot position.

This design requires relatively few moved parts and a relatively high magnetic field strength.

SUMMARY OF THE INVENTION

Considering this, it is the object of the invention to provide a simplified and, at the same time, improved, shift device for a shift clutch of a dobby.

The above object generally is achieved according to the present invention by a control device which comprises a carrier that is driven in an oscillating manner during operation. In so doing, said carrier may perform a short actuation stroke. In so doing, the actuation stroke may describe a straight-line motion or a pivoting motion.

On or at the carrier, a selecting finger is supported so as to be pivotable about a pivot center. The pivot center is configured, for example, as a pin that extends through an opening of the selecting finger. A magnetically conductive armature consisting of a soft magnetic material, for example, iron, plastic material filled with iron powder, or a ferrite. In the vicinity of the selecting finger, an electromagnet is statically supported on the carrier, said electromagnet having two poles. The first pole delimits an air gap with an armature, said air gap being configured as a circular arc and being curved at a constant radius R relative to the pivot center. The second pole delimits an air gap the size of which is a function of the pivoting movement of the selecting finger. The size of the air gap is defined by the distance between the surface of the armature and the surface of the second pole.

Preferably, the armature is arranged in the immediate vicinity of the pivot center, so that the size change of the air gap caused by the pivoting motion of the selecting finger remains minimal. As a result of this, the electromagnet displays a great force of attraction already at the beginning of its working stroke, as a result of which the selecting finger is rapidly accelerated and can switch in a highly dynamic manner. In addition, a relatively strong return spring may be used, so that also the return stroke is completed during a short shifting period.

The control device in accordance with the invention comprises very few movable parts, namely only one selecting finger and only one single bearing. This bearing defines the pivot center of the selecting finger. Therefore, only minimal friction is generated. As a result of the curvature of at least one of the two air gaps, an increase of the magnetic resistance when the selecting finger is pivoted, for example into its inoperative position, can be avoided, this, in turn, benefiting the increase of the force of attraction.

With the use of the control device in accordance with the invention, it is possible to implement particularly short shifting times and thus high rates of revolution of the weaving machine.

The first, curved air gap is preferably configured as a constant air gap that is unaffected by a pivoting motion of the selecting finger. In so doing, said gap's magnetic resistance remains constant, independent of the pivot position of the selecting finger. Regarding its size, the second air gap—the distance of the surface of the armature to the surface of the second pole—is preferably a function of the pivot positions of the selecting finger, so that the magnetic resistance of the second air gap is a function of the pivot position of the selecting finger. Preferably, the second air gap starts at a point having a radius from the pivot center that has approximately the same length as the radius of the first air gap. Starting at such a point, the air gap may extend as a parallel gap or trapezoidal gap in a direction approximately tangential to the curved first air gap.

This configuration is simple, sturdy and efficient.

Whereas the second air gap in the aforementioned embodiment is variable regarding its gap length, so that the magnetic resistance decreases by shortening said gap when the selecting finger is attracted by the electromagnet, it is also possible to configure the second air gap in such a manner that its length remains constant. The magnetic resistance changes on account of the increase or decrease of the air gap area when the selecting finger is pivoted. This applies, for example, to the second air gap, whereas the length and area of the first air gap, as explained above, may be independent of the pivot position of the selecting finger. However, it is also possible to make also the first air gap, and thus the magnetic resistance defined by said gap, dependent on the pivot position of the selecting lever in order to generate, for example, a greater driving torque.

Referring to a simple embodiment, the selecting finger is associated with a spring means that pushes said selecting finger into an inoperative position. The electromagnet attracts the selecting finger against the force of the spring means into another pivot position. Stop means may be provided for the two pivot positions of the selecting finger. For example, the stop means for the one pivot position that is taken by the selecting finger when the electromagnet is not energized may be a vibration-damping buffer. The stop means for the attracting position taken by the selecting finger when the electromagnet is energized may be a pole of the electromagnet against which the armature abuts. In order to avoid a magnetic adhesion effect, the pole may be provided with a plastic film or another damping interlayer.

It is also possible to configure the stop means as appropriate abutment surfaces which are provided on the shift levers that are selected for actuation by the selecting finger. This offers the advantage that it is automatically ensured that the selecting finger is in proper engagement—in both its alternative pivot positions—with respectively one of the two shift levers. In addition, it can be ensured that the armature does not contact the pole of the electromagnet, so that the aforementioned adhesion effects can be avoided.

It is also possible to allocate two electromagnets to the selecting finger, both of said electromagnets being disposed to display a driving effect in the same direction, in order to reduce shifting times by doubling the driving torque. However, it is also possible to provide electromagnets operating in opposite directions, said magnets being energized alternatively, in order to pivot the selecting finger in one or the other position. This embodiment offers the advantage that both shifting times for both pivoting directions of the selecting finger are necessarily substantially identical.

Additional details of advantageous embodiments result form the drawings, the description and the subclaims. The description and the drawings are restricted to the illustration of essential aspects and elements of the invention and miscellaneous situations. Additional details are obvious from the drawings.

The drawings show exemplary embodiments of the invention.

DETAILED DESCRIPTION OF THE INVENTION

Figure 1:
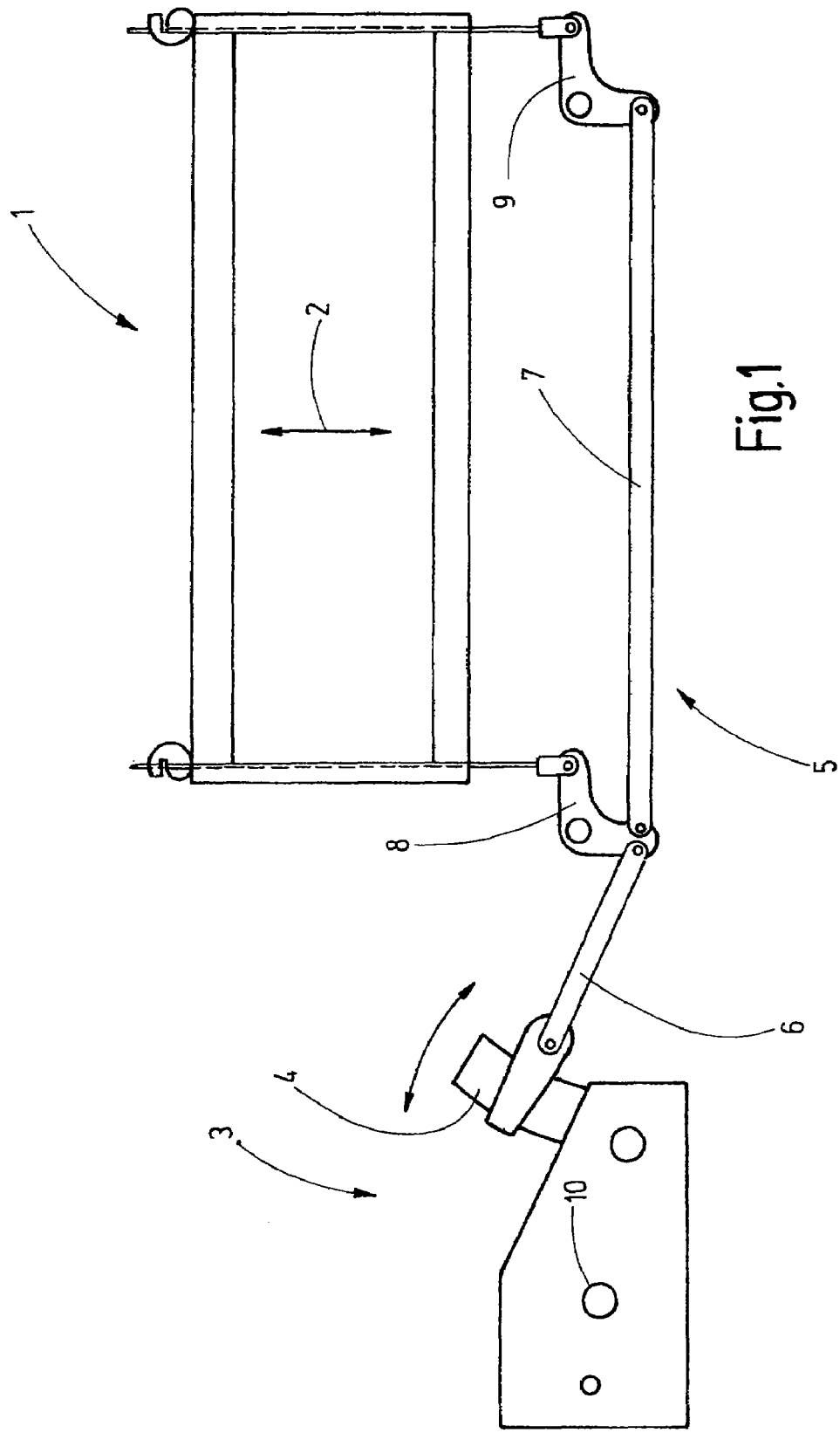
FIG. 1 is a schematic representation of a heald shaft with a shaft drive.
Figure 2:
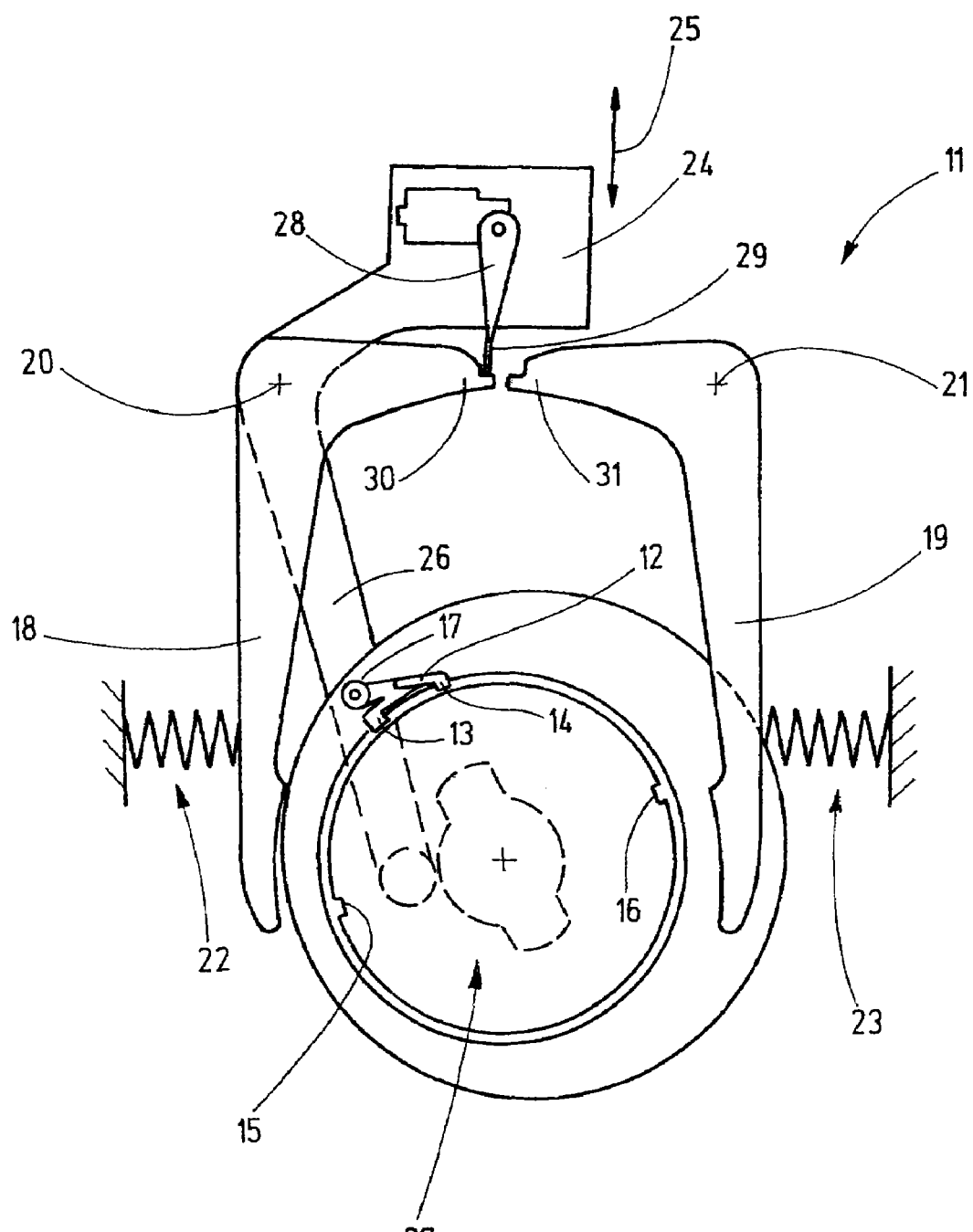
FIG. 2 is a clutch assembly that is a component of the shaft drive, comprising a control device in accordance with the invention.

FIG. 1 shows a heald shaft 1 of a weaving machine, said heald shaft carrying out an oscillating vertical movement during operation, this being indicated by an arrow 2. A dobby 3 is used as the drive, said dobby comprising an oscillating link 4 acting as the output in order to drive the heald shaft 1 via a bar linkage with joint bars 6, 7 and angle levers 8, 9. The dobby 3 translates the rotation of a central shaft 10 into an oscillating movement of the oscillating link 4. This is achieved by eccentrics and disk cams, which, as is shown by FIG. 2, are driven via a shiftable clutch assembly 11. The clutch assembly 11 comprises, for example, a rocker 12 supported by a rotating disk and having one or more projections 13, 14 that are associated with corresponding recesses 15, 16 in a clutch disk. In order to achieve the engagement and disengagement of the projections 13, 14 and the recesses 15, 16, the rocker 12 comprises a shift roller 17 to bypass the corresponding shift surfaces of the shift levers 18, 19 that are supported so as to be pivotable about corresponding pivot axes 20, 21. The spring means 22, 23, which are shown schematically in FIG. 2, are used to elastically bias the shift levers 18, 19 relative to each other. The disks to be coupled rotate between the corresponding shift surfaces of the shift levers 18, 19, at least one of said disks supporting the rocker 12.

In addition, the clutch assembly comprises a carrier 24 which carries out the oscillating movement indicated by arrow 25. To achieve this, said carrier may be driven by a disk cam 27 via a lever 26, said disk cam being driven by the shaft 10.

A selecting finger 28 is pivotally supported on the carrier 24, said selecting finger having an extension 29 projecting in the direction toward the shift levers 18, 19. In so doing, the selecting finger 28 interacts with the lever arms 30, 31 of the shift levers 18, 19 in order to alternatively pivot one or the other shift lever 18, 19, consistent with the cycle of movement of the carrier 24, away from the disks moving between the shift levers 8, 9.

Figure 3:
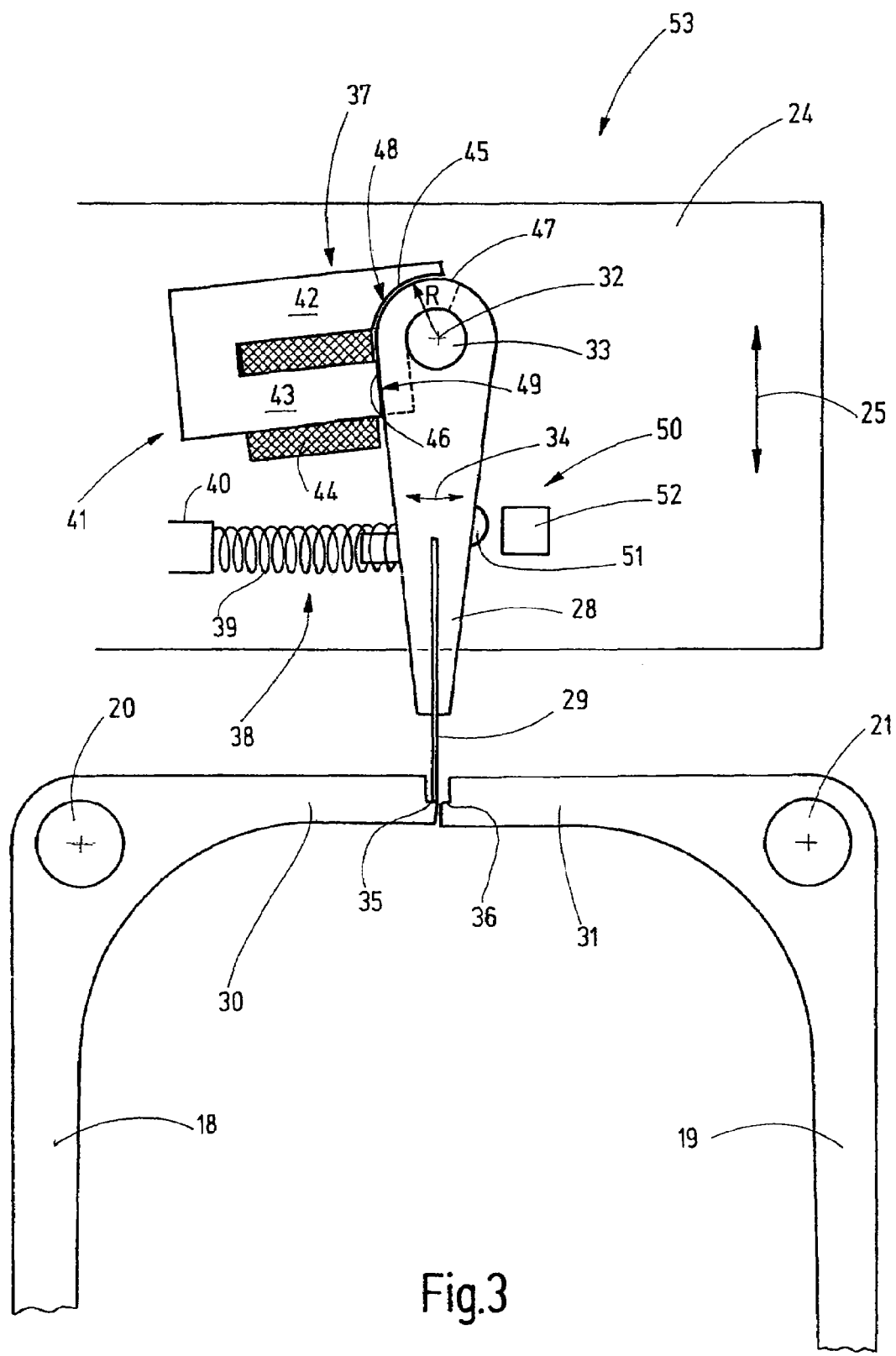
FIG. 3 is a schematized enlarged representation of the control device of the clutch assembly, during one phase of movement.

To do so, the selecting finger 28 is supported on the carrier 24 so as to be pivotable about a pivot center 24 that may consist of a pin 33 connected to the carrier 24, as is obvious, in particular, from the more detailed illustration of FIG. 3. The pivoting motion of the selecting finger 28 is symbolized by an arrow 34 in FIG. 3. The extension 29 alternatively presses against an abutment surface 35 of the lever arm 30 or an abutment surface 36 of the lever arm 31. The abutment surfaces 35, 36 delimit recesses in the ends of the lever arms 30, 31. Said surfaces may be rounded in order to define a low-friction rolling engagement with the extension 29 during the pivoting motion. In inoperative position, the lever arms 30, 31 are positioned closely opposite each other. The two recesses provided at the end of said lever arms delimit a shared space through which the extension 29 may pass during a back-and-forth movement in order to come alternatively in engagement either with the abutment surface 35 or alternatively with the abutment surface 36 that is separated from said abutment surface 35 by only a gap.

In the immediate vicinity of the pivot center 32 or the pin 33, the carrier 24 supports an electromagnet 37 which is disposed to specifically move the selecting finger 28, e.g., against the force of a spring means 38. The spring means 38 may comprise various elements. In the present exemplary embodiment, said spring means is configured as a compression spring 39, whose one end abuts against the selecting finger 28 and whose other end abuts against an abutment 40 that is provided on the carrier 24.

The electromagnet 37 has a core 41 preferably consisting of iron, ferrite or another soft magnetic material and two limbs 42, 43 that are connected to each other on one end and are part of a magnetic circuit. At least one of the limbs 42, 43 bears a magnetic coil 44. Poles 45, 46 are formed on the ends of the limbs 42, 43. The first pole 45 is delimited by an end surface following a the circular arc around the pivot center 32. The second pole 46 on the limb 43 may be a flat surface.

Rigidly supported on the selecting finger 28 is an armature 47 that preferably consists of soft magnetic magnetically conductive material such as, for example, iron or ferrite. In the vicinity of the first pole 45, the armature 47 is provided with a surface that is curved in the shape of a circular arc, said surface having a constant radius relative to the pivot center 32. In addition, the correspondingly curved outside of the armature 46 extends beyond the ends of the pole 45 in circumferential direction. Between the armature 47 and the pole 45 there is a narrow air gap 48 curved in the shape of a circular arc, said air gap having a constant radius R relative to the pivot center 32.

A preferably straight limb of the armature 47 extends to the second pole 46 which has a flat end surface, for example. Correspondingly, the armature 47 has, in this region, a flat surface and delimits an air gap 49 with the second pole 46. The length of the air gap, the distance of the opposing surface of the armature 47 and the surface of the pole 46 are a function of the pivot position of the selecting finger 28. This position is at its minimum or zero when the selecting finger 28 is in the left-hand side position in FIG. 3, in engagement with the lever arm 30, against the force of the spring means 38. This position is at its maximum when the selecting finger 28 is pivoted to the right-hand side in FIG. 3 and is in engagement with the lever arm 31.

The selecting finger 28 may be associated with a stop or a stroke-limiting means 50. This may also comprise a sound-damping buffer 51 provided on the selecting finger 28 as well as comprise an appropriate abutment 51 provided on the carrier 24. The buffer 51 and/or the abutment 52 may consist of a vibration-inhibiting damping material, for example, a synthetic material displaying high internal friction. The carrier 24, the drive allocated to said carrier, as well as the selecting finger 28 and the electromagnet 37 form a control device 53 for the clutch assembly 11. This control device 53 operates as follows:

During operation, the carrier 24 carries out an oscillating movement as identified by arrow 25. In the course of this movement, the extension 29 impinges either against the abutment surface 35 or against the abutment surface 36, depending on the pivot position taken by said carrier. When the electromagnet 37 is not energized, the spring means 38 pushes the selecting finger 28 into the inoperative position. Said selecting finger pivots into a position, in which the buffer 51 comes to abut against the abutment 52. Now, when the carrier 24 moves downward, the extension 29 impinges against the abutment surface 36 of the lever arm 31. In this state, the air gap 48 displays a fixed resistance that is a function of said gap's length and width. The air gap 49 displays a magnetic resistance that is basically a function of the position of the selecting finger 28, said resistance having the greater of two values due to the distance of the armature 47 from the second pole 46.

Figure 4:
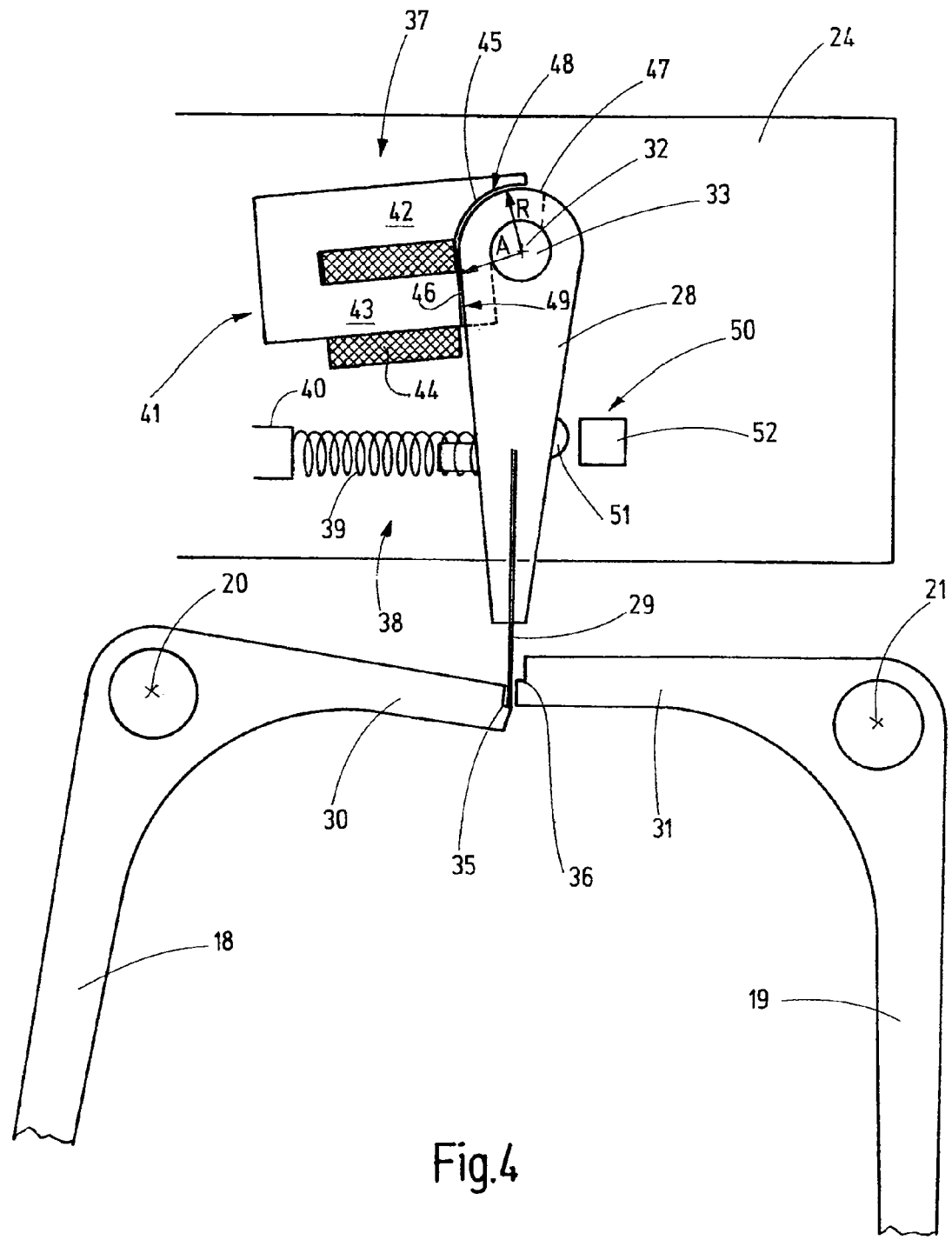
FIG. 4 shows the control device in accordance with FIG. 3, during another phase of movement.

When, in the course of its oscillation, the carrier 24 is in an upper position away from the lever arms 30, 31, the electromagnet 37 can be energized. The pole 46 now attracts the armature 47, as a result of which the selecting finger 28 pivots into the position on the left, as shown in FIG. 4; and the air gap 49, and the distance of the opposing armature surface and the pole surface is reduced. In contrast, the air gap 48 remains unchanged. The magnetic resistance of the air gap 49 now assumes the lower of the two values. Now, when the carrier 24 moves downward, the extension 29 pushes against the abutment surface 35 and pivots the shift lever 18, as shown by FIG. 4. Then, the extension 29 comes into engagement with the abutment surface 35 of the lever arm 30.

Inasmuch as the magnetic resistance of the first air gap 48 remains constant—independent of the pivot position of the selecting finger 28—any excessive weakening of the magnetic field with the open air gap 49 is being counter-acted. Thus, the electromagnet 37 has a relatively high initial field strength and can accelerate the selecting finger 28 very rapidly. This is also helped by the fact that the second pole 46 begins at a point, said point's distance A (FIG. 4) from the pivot center 32 substantially corresponding to the radius R.

The present description relates to an exemplary embodiment of the invention that permits numerous modifications. For example, in addition to the stop and stroke-limiting means 50 arranged on one side of the selecting finger 28, it is also possible to provide a corresponding stop and stroke-limiting means on the opposite side. Alternatively, the stop and stroke-limiting means 50 may also be omitted. This is possible in particular when the stroke of the carrier 24 is so small that the extension 29 never moves fully out of the recesses delimited by the abutment surfaces 35, 36. In this case, the parts of the abutment surfaces 35, 36 extending approximately parallel to the extension 29 may act as stop and stroke-limiting means.

Furthermore, the pole 46 of the electromagnet 27 may act as a stop and stroke-limiting means. In this case, the length of the air gap 49 moves to zero when the electromagnet 37 is in attracting mode and the selecting finger 38 pivots accordingly. On the pole 46 and/or on the armature 47, it is possible to provide a non-magnetic spacer element, e.g., of plastic material, brass, aluminum or the like, in order to maintain a residual air gap when the electromagnet 47 is excited.

Figure 5:
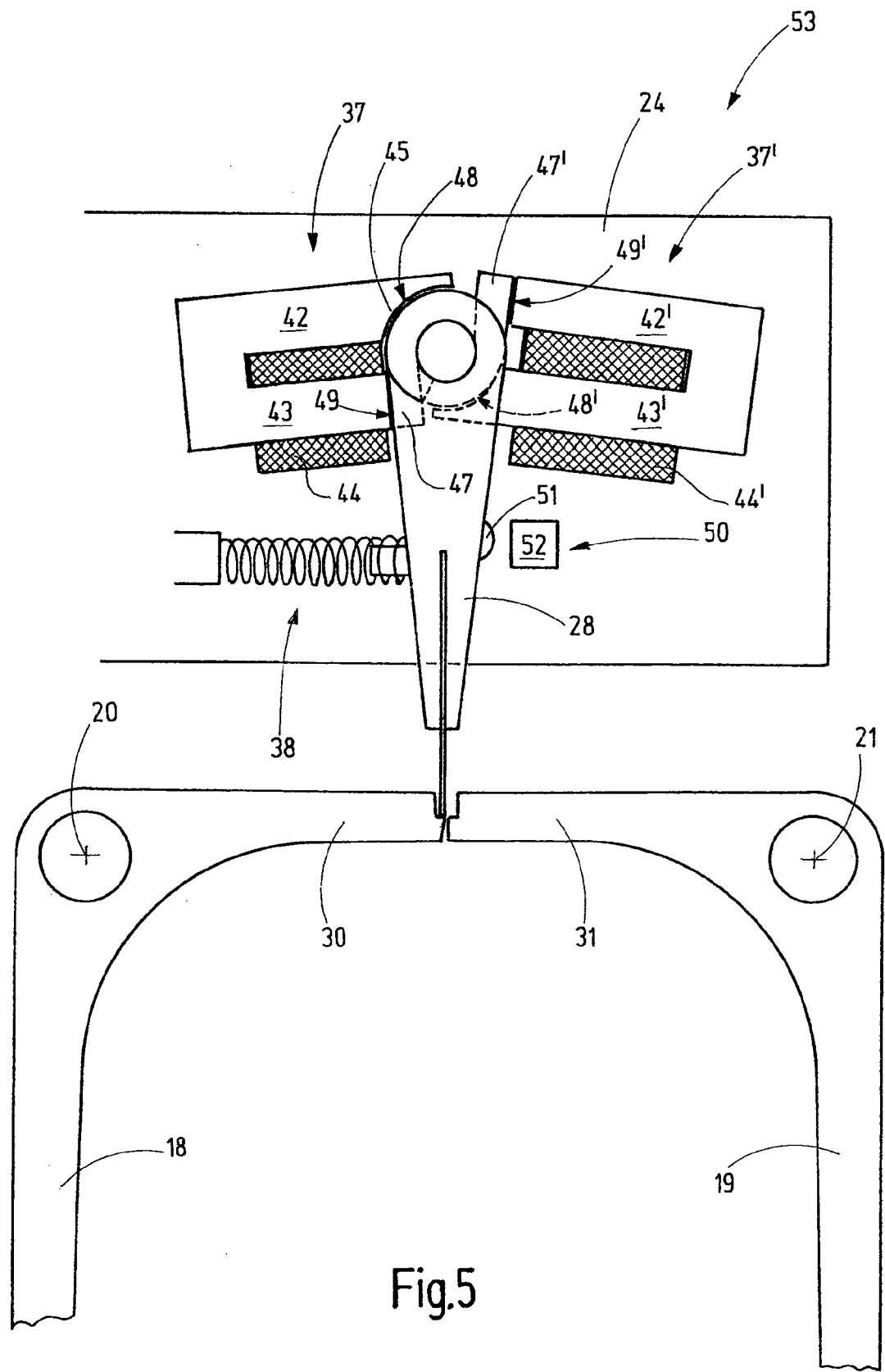
FIG. 5 is a schematized representation of a modified embodiment of the control device.

FIG. 5 shows a modified embodiment; regarding its explanation, reference is made to the above description with reference to the same reference numbers. In addition, the control device 53 in accordance with FIG. 5 comprises a second electromagnet 37' that is associated with an armature 47' that is rigidly connected to the selecting finger 28. The pivot drive device designed in this manner is constructed in a manner identical to the drive device comprising the armature 47 and the electromagnet 37. Using the same reference numbers with an apostrophe added, reference is made to the above description, which applies analogously. Both drive devices (electromagnet 37 and armature 47, as well as electromagnet 37' and armature 47') are disposed to drive in the same direction. When their electromagnets 37, 37' are energized, both drive devices generate a torque that opposes the force of the spring means 38.

Figure 6:
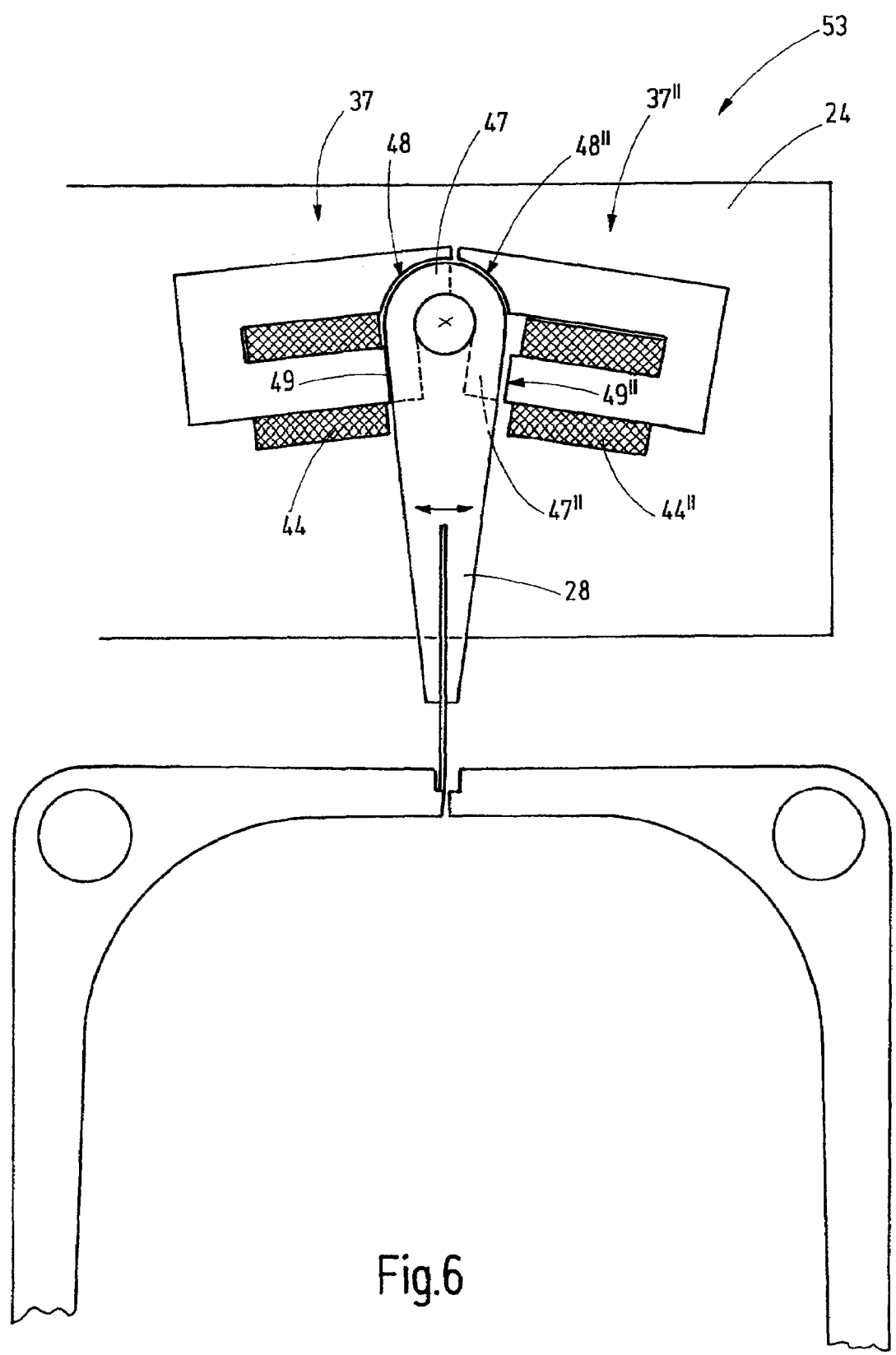
FIGS. 6 through 8 are schematized representations of additional embodiments of the control device in accordance with the invention.

Referring to another modification, however, it is also possible to omit the spring means 38. FIG. 6 shows such a control device 53. Referring to this device, the carrier 24 supports the drive device comprising the electromagnet 37 and the armature 47, as has already been described in conjunction with the aforementioned embodiments. In addition, a second drive device is provided, said device comprising an electromagnet 37" and an armature 47". The last-mentioned drive device is designed in a manner mirror-symmetrical with respect to the first-mentioned drive device, whereby, apart from this, the above description applies. While the first-mentioned drive device (on the left in FIG. 6) rotates the selecting finger 28 in clockwise direction, the second-mentioned drive device (on the right in FIG. 6) rotates the selecting finger 28 in counter-clockwise direction. The back-and-forth pivoting of the selecting finger 28 is achieved by alternatively energizing the coil 44 or 44".

Figure 7:
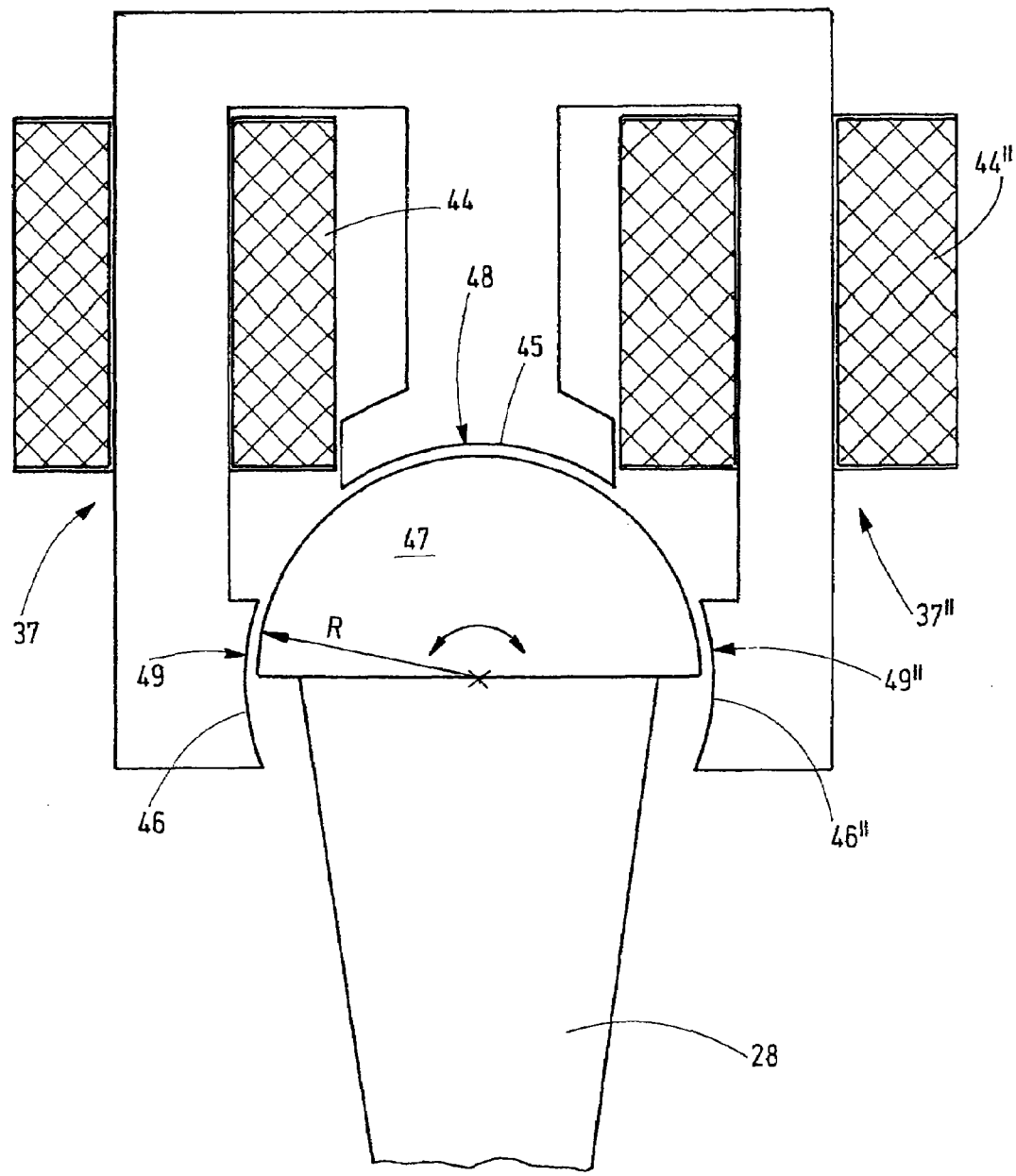
Figure 8:
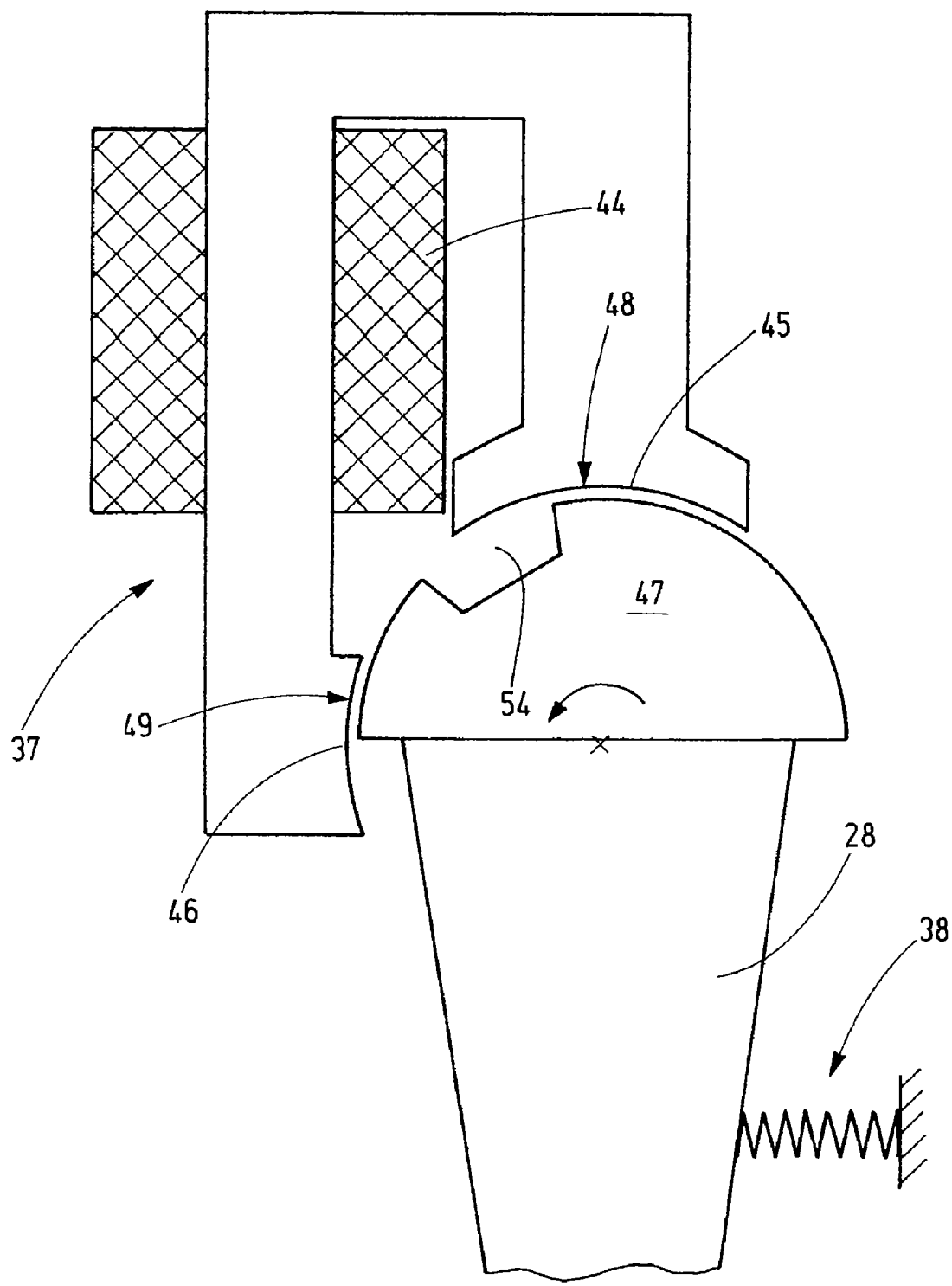

While the aforementioned exemplary embodiments explain the drive devices for the selecting finger 28, whereby the driving force for the selecting finger 28 is achieved by changing the length of the air gap, the embodiments in accordance with FIGS. 7 and 8, show examples, whereby the change of the size of the area of the air gap is used to drive the selecting finger 28. To the extent that the construction and function are similar or the same with respect to the aforementioned embodiments, corresponding reference numbers are used and reference is made to the above description.

Referring to the exemplary embodiment in accordance with FIG. 7, the first air gap 48 formed on the first pole 45 is again independent of the position of the selecting finger 28. Also, the second air gap 49 is now curved with the radius R.

The armature 47, however, overlaps only a part of the pole 46, whereby the overlap increases or decreases with a pivoting movement of the selecting finger 28. The air gap area changes accordingly. On the opposite side, an air gap 49" is provided, the size of said gap changing in a direction opposite to that of the air gap 49. The armature 47 extends from the pole 46 past the pole 45 up to the pole 46". When the left coil 44 in FIG. 7 is energized, the selecting finger 28 pivots in counterclockwise direction, because the magnetic force of the generated magnetic circuit has a tendency to increase the overlap between the armature 47 and the pole 46. Accordingly, the selecting finger 28 pivots in clockwise direction when only the right coil 44" is energized. The operating principle of the magnetic force can be intensified in that the surface of the pole 46 and the surface of the pole 46", as well as the surface of the armature 47, have recesses and elevations. The surfaces then have the configuration of denticulated surfaces, whereby the shape of the elevations or teeth may be rectangular, trapezoidal, or have a different form. By providing denticulated surfaces, the number of magnetic lines of force acting outside the pivot center of the armature 47 increases, and thus the torque of the armature 47 is intensified.

FIG. 8 illustrates another modified embodiment that is based on the embodiment of FIG. 7, in which case, however, the right coil 44" has been omitted. In addition, the armature 47 has a recess 54 near the pole 45, so that the armature 47 will now only partially cover the pole 45 and the pole 46. To this extent, the air gap 48, as well as the air gap 49, can be varied in the same sense. When the coil 44 is energized, the magnetic force generated by the magnetic circuit must increase the overlap of the armature 47 with the pole 45 as well as the overlap of the armature 47 with the pole 46. Consequently, the selecting finger 28 pivots to the right. Again, the spring means 38 can be used for resetting.

A control device 53 for a clutch assembly designed as a shift clutch 11 of a dobby comprises a selecting finger 28 that is driven by an electromagnet 37. The selecting finger is rigidly connected to an armature 47 that has a curved armature section and a straight armature section. Together with an appropriately curved pole 45 of the magnetic circuit, the curved armature section forms an air gap 48 that is preferably not influenced by the pivot position of the selecting finger. The other pole 46 of the electromagnet 37 forms a preferably straight air gap 49, said air gap being variable and having a size that is a function of the pivot position of the selecting finger. Due to the existing lever ratios, the maximum width of the trapezoidal gap is substantially smaller than the path of the outer end of the selecting finger 28 between its two selection positions. The distance A between the pivot center 32 and the variable air gap 49 is substantially smaller than the length of the selecting finger 28.

It will be appreciated that the above description of the present invention is susceptible to various modifications, changes and modifications, and the same are intended to be comprehended within the meaning and range of equivalents of the appended claims.

LIST OF REFERENCE NUMBERS

1 Heald shaft
2 Arrow
3 Dobbie
4 Link
5 Bar linkage
6, 7 Joint bars
8, 9 Angle levers
10 Shaft
11 Clutch assembly
12 Rocker
13, 14 Projections
15, 16 Recesses
17 Roller
18, 19 Shift levers
20, 21 Pivot axes
22, 23 Spring means
24 Carrier
25 Arrow
26 Lever
27 Disc cam
28 Selecting finger
29 Extension
30, 31 Lever arms
32 Pivot center
33 Pin
34 Arrow
35, 36 Abutment surfaces
37 Electromagnet
38 Spring means
39 Compression spring
40 Abutment
41 Core
42, 43 Limbs
44 Coil
45, 46 Poles
47 Armature
48, 49 Air gaps
R Radius
50 Stop or stroke-limiting means
51 Buffer
52 Abutment
53 Control device
A Distance
54 Recess

What is claimed is:

1. Control device (53) for a shift clutch (11) of a dobby, comprising:
   a carrier (24),
   a selecting finger (28) that is supported on the carrier (24) so as to be pivotable about a pivot center (32) and contains a magnetically conductive armature (47),
   an electromagnet (37) that is statically supported on the carrier (24) and has a core (41) with two poles (45, 46),
   wherein the first pole (45), together with the armature (47), defines a first air gap (48), said air gap being curved in the form of a circular arc having a constant radius (R) relative to the pivot center (32), and
   wherein the second pole (46), together with the armature (47), defines a second air gap (49), said air gap having a size that is a function of the pivoting movement of the selecting finger (28).

2. Control device in accordance with claim 1, characterized in that the first air gap (48) is configured as a constant air gap (48) that is not influenced by a pivoting movement of the selecting finger (28).

3. Control device in accordance with claim 1, characterized in that the second air gap (49) has a gap length that is a function of the pivot position of the selecting finger (28), whereby said gap length is to be measured as the distance between the second pole (48) and the armature (47).

4. Control device in accordance with claim 1, characterized in that the second air gap (49) has a trapezoidal cross-section.

5. Control device in accordance with claim 1, characterized in that the second air gap (49) has a gap width that is a function of the pivot position of the selecting finger (28), whereby said gap width is to be measured between the surfaces of the pole (46) and of the armature (47) representing the parallel boundaries of the air gap (49).

6. Control device in accordance with claim 1, characterized in that the selecting finger (28) is associated with a spring means (38) in order to bias said selecting finger against the force of the electromagnet (37) and to push said selecting finger into an inoperative position when the electromagnet (37) is not energized.

7. Control device in accordance with claim 1, characterized in that the selecting finger (28) is associated with a stop means (50) in order to hold said selecting finger in a defined operative position when the electromagnet (37) is energized.

8. Control device in accordance with claim 1, characterized in that the selecting finger (28) is associated with a second electromagnet (37', 37") in order to drive said selecting finger.

9. Control device in accordance with claim 8, characterized in that the second electromagnet (37', 37") drives the selecting finger (28) in the same driving direction as the first electromagnet.

10. Control device in accordance with claim 8, characterized in that the second electromagnet (37', 37") drives the selecting finger (28) in a different driving direction than the first electromagnet (37).

* * * * *